(12) United States Patent
Johnson

(10) Patent No.: US 7,077,374 B1
(45) Date of Patent: Jul. 18, 2006

(54) MOUNTING APPARATUS

(76) Inventor: Thomas Joseph Johnson, 325 W. Harrison, Wheaton, IL (US) 60187

( * ) Notice: Subject to any disclaimer, the term of this patent is extended or adjusted under 35 U.S.C. 154(b) by 0 days.

(21) Appl. No.: 10/256,595

(22) Filed: Sep. 27, 2002

Related U.S. Application Data

(60) Provisional application No. 60/325,630, filed on Sep. 28, 2001.

(51) Int. Cl.
*F16M 13/00* (2006.01)
(52) U.S. Cl. ............. 248/551; 206/335; 206/807; 403/316; 411/451.4; 411/452
(58) Field of Classification Search ........... 248/507, 248/509, 551; 206/335, 807; 403/315, 316, 403/317, 319, 279–282; 411/452, 451.4, 411/456, 451.3, 910, 911; 292/327, 331
See application file for complete search history.

(56) References Cited

U.S. PATENT DOCUMENTS

| | | | | |
|---|---|---|---|---|
| 1,602,383 A * | 10/1926 | Andersson | .................. | 312/111 |
| 3,347,353 A * | 10/1967 | Kline | ......................... | 206/335 |
| 3,886,988 A * | 6/1975 | Garrett et al. | ............. | 206/335 |
| 4,015,710 A * | 4/1977 | Biggs | ......................... | 206/386 |
| 4,097,168 A * | 6/1978 | Pagel | ......................... | 403/388 |
| 4,792,039 A * | 12/1988 | Dayton | ...................... | 206/304 |
| 4,828,444 A | 5/1989 | Oshida | | |
| 4,842,148 A | 6/1989 | Bowman | | |
| 4,934,572 A | 6/1990 | Bowman et al. | | |
| 4,973,211 A * | 11/1990 | Potucek | ..................... | 411/452 |
| 5,092,504 A | 3/1992 | Hannes et al. | | |
| 5,497,708 A * | 3/1996 | Jeruzal | ...................... | 108/54.1 |
| 5,520,280 A | 5/1996 | Lickton | | |
| 5,566,828 A * | 10/1996 | Claes et al. | .................. | 206/570 |
| 5,586,005 A * | 12/1996 | Cipolla et al. | ............. | 361/719 |
| 5,699,945 A | 12/1997 | Micklish | | |
| 5,749,694 A | 5/1998 | Ackerman et al. | | |
| 5,775,863 A | 7/1998 | Anderson | | |
| 5,779,119 A | 7/1998 | Talbot et al. | | |
| 6,039,243 A | 3/2000 | Lickton | | |
| 6,167,735 B1 | 1/2001 | Brown | | |
| 6,283,310 B1 | 9/2001 | Dean et al. | | |
| 6,406,074 B1 * | 6/2002 | Mahaney | .................... | 292/327 |

FOREIGN PATENT DOCUMENTS

DE 4226945 2/1994

* cited by examiner

*Primary Examiner*—Korie Chan
(74) *Attorney, Agent, or Firm*—Trexler, Bushnell, Giangiorgi, Blackstone & Marr, Ltd.

(57) ABSTRACT

A mounting apparatus for mounting a product to a structure is provided. The apparatus secures the product to the structure to prevent damage of the product during shipping. The mounting apparatus includes a base plate, two pin members, two pin engaging members, and a mounting device. The base plate has two apertures therethrough and is positioned against the structure. Each pin member has an enlarged head portion and a stem portion extending therefrom. In use, the stem portion of each pin member extends through the structure, through the associated aperture of the base plate, and is engaged with a respective pin engaging member. The head portion is positioned against the structure. Each pin engaging member is capable of releaseably holding the associated pin member. The mounting device allows for the connection of the product to the base plate. The mounting device is positioned between the apertures of the base plate.

51 Claims, 7 Drawing Sheets

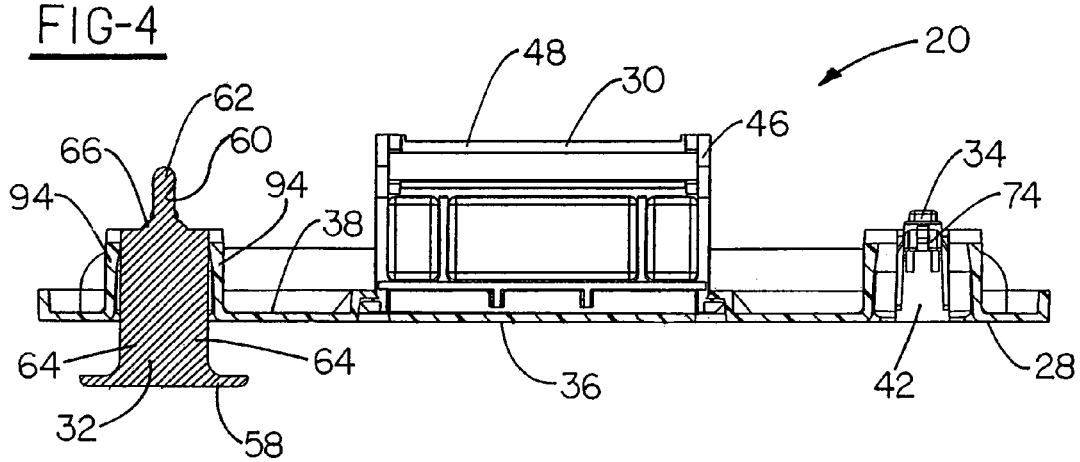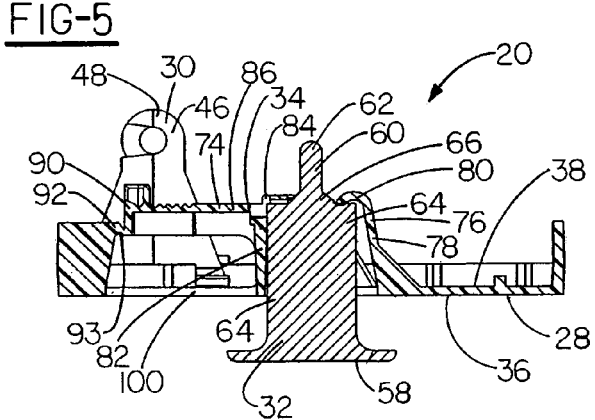

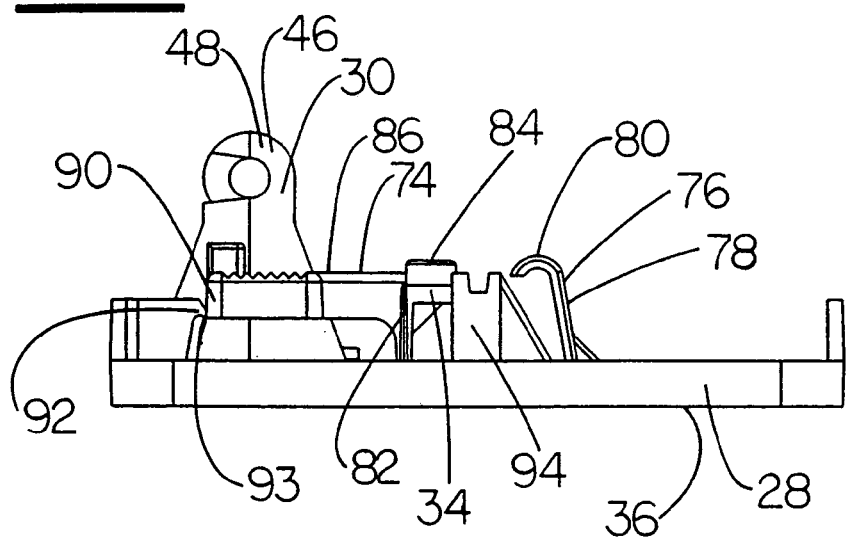
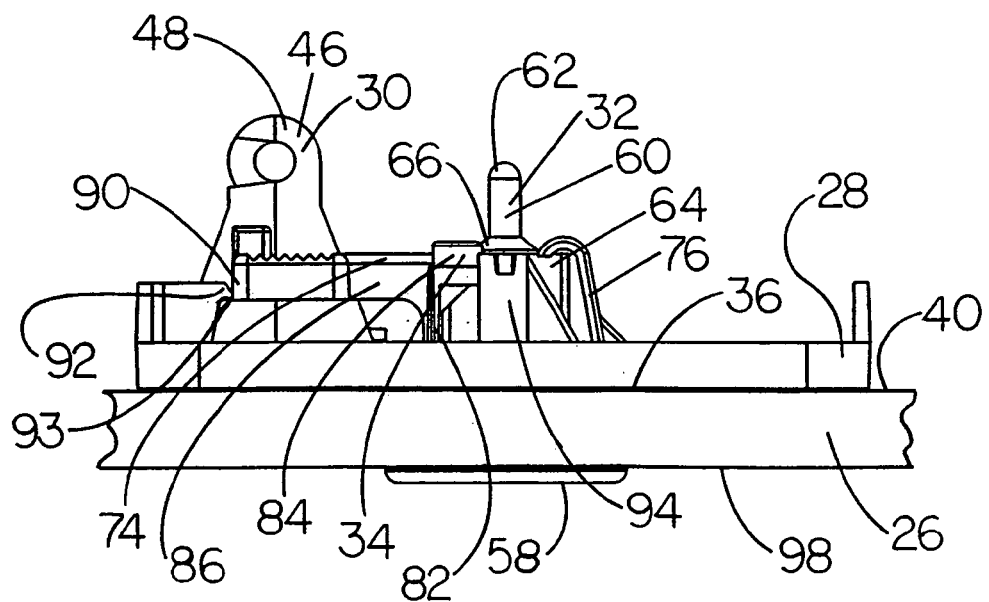

MOUNTING APPARATUS

CROSS-REFERENCE

This patent application claims the benefit of domestic priority of U.S. Provisional Application Ser. No. 60/325,630, filed Sep. 28, 2001, and entitled "Bicycle Fork Mount Apparatus".

BACKGROUND OF THE INVENTION

The present invention relates to a mounting apparatus for mounting a product to a structure. More particularly, the present invention relates to a mounting apparatus for mounting a bicycle fork to a shipping container.

Shipping containers are utilized to safely transport products from one place to a second place. One example of a shipping container which is designed to safely transport products from one place to another is a shipping container designed for the transportation of bicycles. Two such shipping containers are described in detail in U.S. Pat. Nos. 5,520,280 and 6,039,243. Such shipping containers, however, do not fix the bicycle therein such that the bicycle is loose within the shipping container when the container is shipped, thus possibly allowing the bicycle to be damaged during shipping.

Therefore, an apparatus is provided for holding a product in place during shipping such that the product is not loose within the shipping container, thus preventing damage to the product during shipping. The present invention provides such an apparatus which utilizes a self-locking fastener which also overcomes disadvantages of prior art self-locking fasteners. For instance, U.S. Pat. No. 5,775,863 discloses a self-locking fastener having a post and a clip. When the post is inserted into the clip, the clip immediately engages the post and locks the post into position. Pulling the post from the opposite end from the engagement thereof with the clip, will initiate disengagement of the post from the clip which can be undesirable.

Features and advantages of the present invention will become apparent upon a reading of the attached specification, in combination with a study of the drawings.

OBJECTS AND SUMMARY OF THE INVENTION

A primary object of the invention is to provide an apparatus for mounting a product to a structure to help prevent damage to the product during transportation or shipping thereof.

An object of the invention is to provide an apparatus which can be quickly and easily mounted to a structure, such as a shipping container.

Another object of the invention is to provide an apparatus which can be quickly and easily released from a structure, such as a shipping container.

Still another object of the invention is to provide a mounting apparatus for mounting a product to a structure, such as a shipping container, which can be easily and inexpensively manufactured.

Another object of the invention is to provide a mounting apparatus which can alert an operator as to whether the mounting apparatus has been tampered with during the first use of the mounting apparatus.

Another object of the invention is to provide a mounting apparatus which can be mounted or released without the use of tools.

Still another object of the invention is to provide a mounting apparatus which can be reused a number of times.

An object of the invention is to provide an apparatus for mounting a bicycle fork to a shipping container to help prevent damage to the bicycle during the shipping thereof.

Briefly, and in accordance with the foregoing, a mounting apparatus for mounting a product to a structure, such as a shipping container, is provided. The apparatus is utilized to secure the product to the shipping container to prevent damage of the product during shipping. The mounting apparatus includes a base plate, two pin members, two pin engaging members, and a product mounting device. The base plate has two apertures therethrough and the base plate is capable of being positioned against a first surface of the shipping container. Each pin member has an enlarged head portion and a stem portion extending therefrom. In use, the stem portion of each pin member extends through the shipping container, through the associated aperture of the base plate, and is engaged with a respective pin engaging member. The head portion is positioned against a second surface of the shipping container. Each pin engaging member is capable of releaseably holding the associated pin member. The product mounting device allows for the connection of the product to the base plate. The product mounting device is positioned between the apertures of the base plate.

BRIEF DESCRIPTION OF THE DRAWINGS

The features of the present invention which are believed to be novel are described in detail hereinbelow. The organization and manner of the structure and operation of the invention, together with further objects and advantages thereof, may best be understood by reference to the following description taken in connection with the accompanying drawings wherein like reference numerals identify like elements in which:

FIG. 4 is a cross-sectional side view of the mounting apparatus along line 4—4 of FIG. 3;

FIG. 5 is a cross-sectional side view of the mounting apparatus along line 5—5 of FIG. 3;

FIG. 8 is a side plan view of the mounting apparatus of FIG. 1, but without the pin member engaged with one of the pin engaging members;

FIG. 9 is a side plan view of the mounting apparatus of FIG. 1, with the pin member engaged with one of the pin engaging members;

FIG. 10 is a front plan view of an alternative embodiment of a pin member, which incorporates features of the invention.

DETAILED DESCRIPTION OF THE ILLUSTRATED EMBODIMENTS

Figure 1:
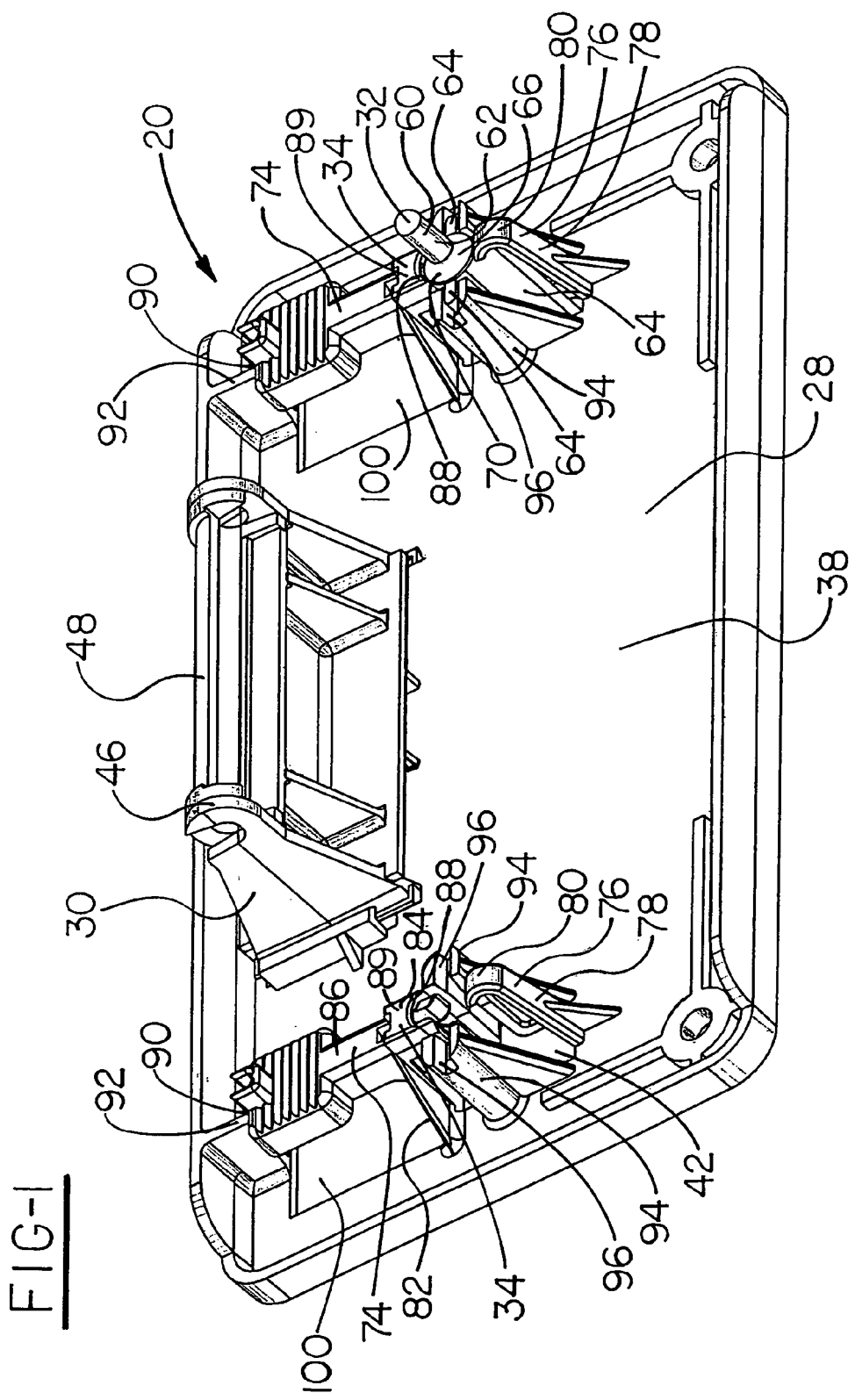
FIG. 1 is a perspective view of a mounting apparatus, which incorporates features of the invention, showing a base plate, a mounting device, a pair of pin engaging members, and a pin member engaged with one of the pin engaging members.

While this invention may be susceptible to embodiment in different forms, there is shown in the drawings and will be described herein in detail, specific embodiments with the understanding that the present disclosure is to be considered an exemplification of the principles of the invention, and is not intended to limit the invention to that as illustrated and described herein.

A mounting apparatus 20 of the present invention is illustrated in FIG. 1. The mounting apparatus 20 is preferably utilized to releaseably secure a fork 22 of a bicycle 24 to a shipping container 26. The shipping container 26 is preferably formed of corrugated paper material and is in a form similar to those illustrated in U.S. Pat. Nos. 5,520,280 and 6,039,243. It should be noted that the mounting apparatus 20 could also be utilized to releaseably secure other products to other types of structure, such as ovens, televisions, microwaves, VCRs, DVD players, central processing units, etc. with the mounting apparatus 20 connecting to a base or a side of these products. For clarity purposes, however, the mounting apparatus 20 will be described herein as being utilized for releaseably securing the fork 22 of the bicycle 24 to the shipping container 26.

The mounting apparatus 20 includes a base plate 28, a mounting device 30, two pin members 32 (only one of which is illustrated in the drawings), and two pin engaging members 34.

The base plate 28 has a first surface 36 and a second surface 38. The first surface 36 of the base plate 28 is preferably flat such that the first surface 36 of the base plate 28 can lie flat against a first surface 40, which may be the inner side, of the shipping container 26. The base plate 28 has a pair of apertures 42 therethrough, which are a predetermined distance apart, such that each aperture 42 is capable of receiving one of the two pin members 32, as will be discussed further herein. Each aperture 42 has a plurality of slots 44 along the outer perimeter thereof. Each aperture 42 preferably has two slots 44 along the outer perimeter which are diametrically opposed.

Figure 11:
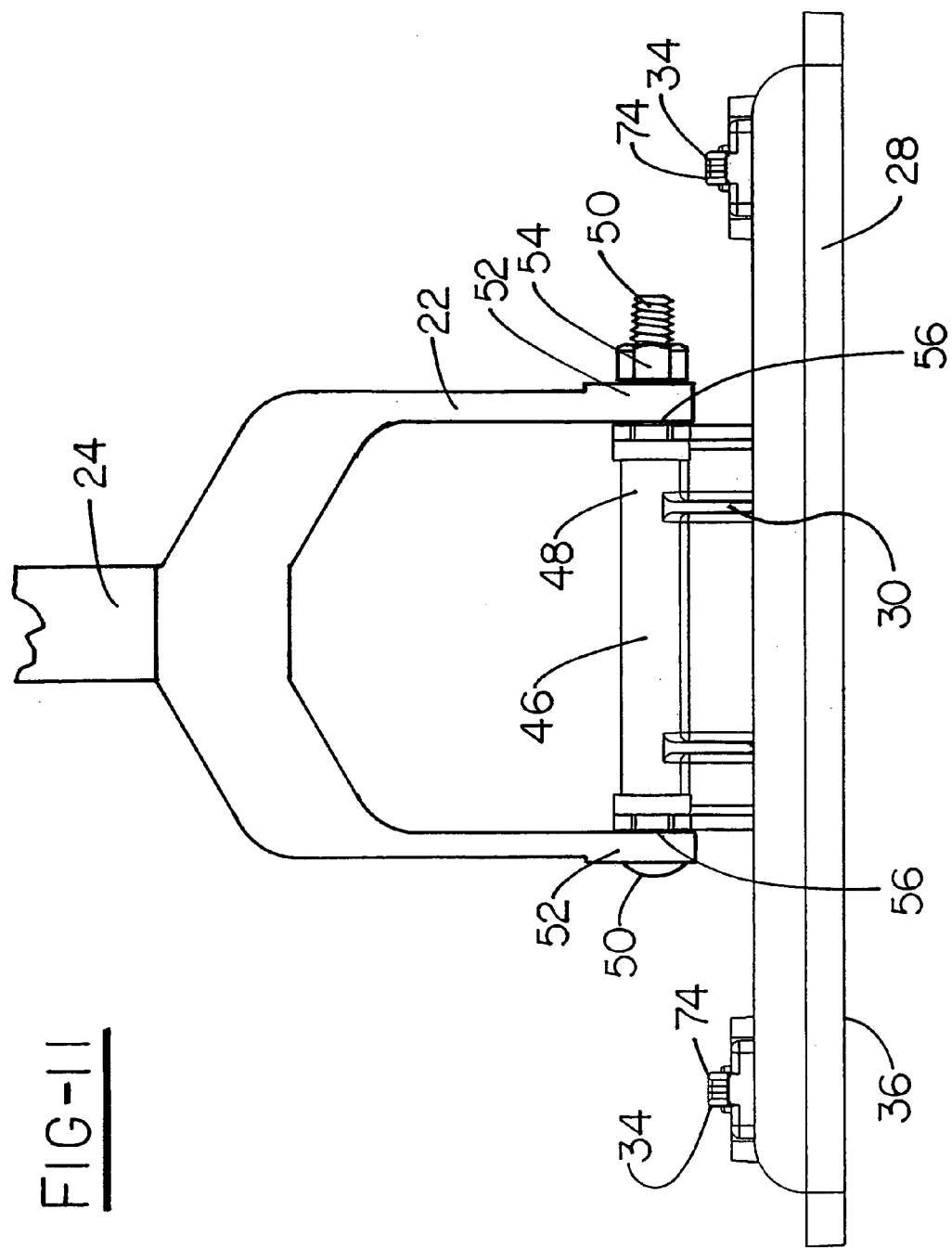
FIG. 11 is a front plan view of the mounting apparatus of FIG. 1, but without the pin member engaged with one of the pin engaging members, and showing a fork of a bicycle mounted to the mounting device.

The mounting device 30 is positioned on and extends from the second surface 38 of the base plate 28. The mounting device 30 is positioned between the apertures 42 of the base plate 28. As best illustrated in FIGS. 1 and 11, the mounting device 30 includes a base 45 which extends from the second surface 38 of the base plate 28 and an arcuate portion 48 which has closed ends 46. The arcuate portion 48 receives a bolt 50. The bicycle fork 22 has a pair of C-shaped portions 52 at its ends which rest on the bolt 50. A fastening member 54, such as a nut or a wing nut, is threaded onto the bolt 50 and presses the C-shaped portions 52 of the bicycle fork 22 against substantially flat sides 56 of the closed ends 46. Thus, the mounting device 30 releaseably secures the bicycle fork 22 thereto such that the bicycle 24 is secured thereto.

Figure 2:
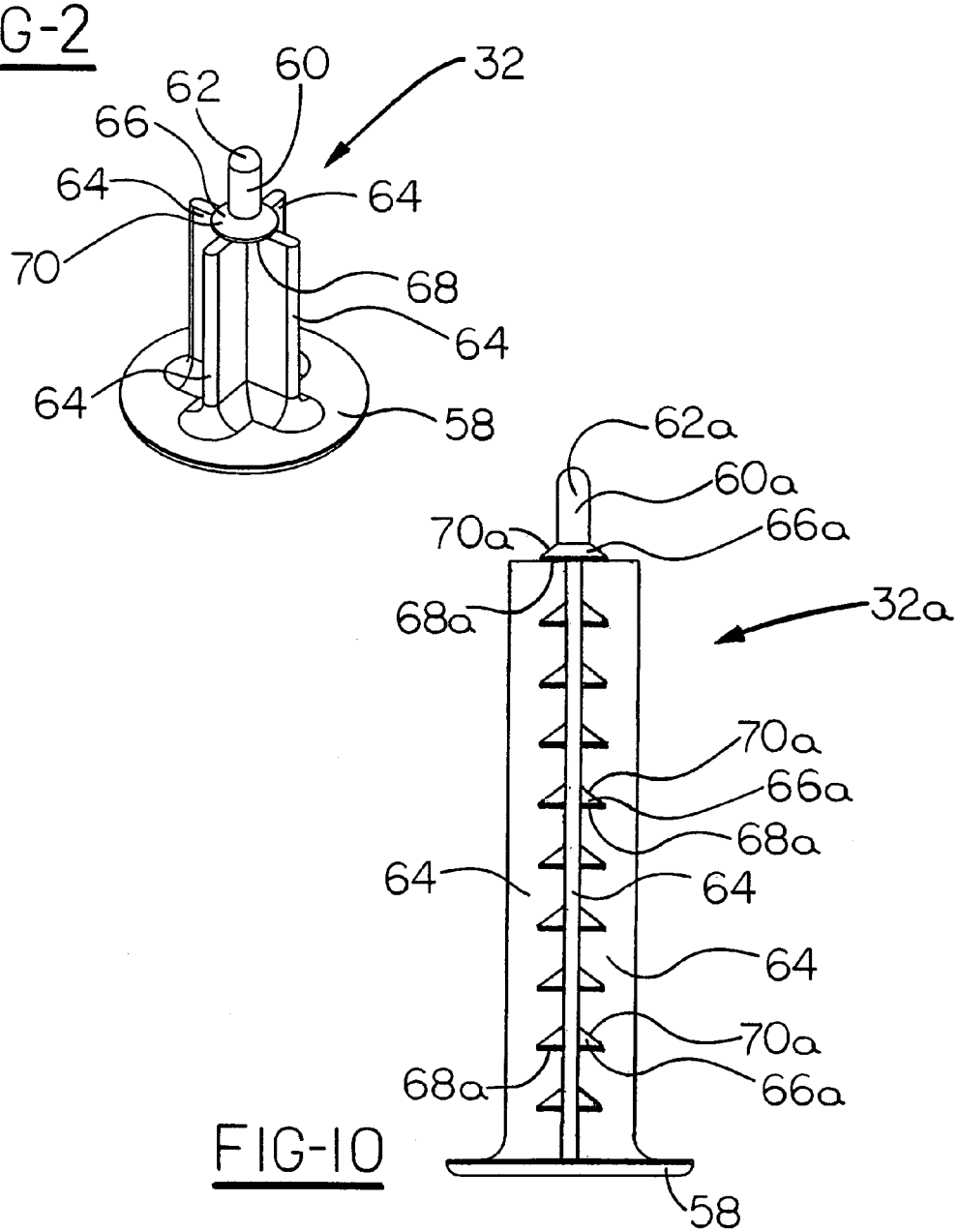
FIG. 2 is a perspective view of the pin member of the mounting apparatus shown in FIG. 1.

As best illustrated in FIG. 2, each pin member 32 includes an enlarged head portion 58 and a stem portion 60 which extends therefrom. The enlarged head portion 58 is generally flat and round and has a diameter which is larger than a diameter of the stem portion 60 along a longitudinal axis of the pin member 32. At an end of the stem portion 60 which is opposite of the connection between the stem portion 60 and the enlarged head portion 58, the stem portion 60 is provided with a piercing portion 62, which is narrower than the remainder of the stem portion 60.

The stem portion 60 of each pin member 32 includes a plurality of pin walls 64 extending radially outwardly from a centerline of the pin member 32. The stem portion 60 preferably has four pin walls 64 extending radially outwardly from the outer circumference thereof such that each pin wall 64 is separated from adjacent pin walls 64 by 90 degrees. The stem portion 60 can be inserted through one of the apertures 42 with two of the pin walls 64 being inserted through the slots 44 of the one aperture 42. As such, the pin member 32 must be perpendicularly oriented relative to the base plate 28 in order to mount the base plate 28 thereon in hands free engagement, as will be discussed further hereinbelow. The two pin walls 64 which are inserted through the slots 44 of the one aperture 42 also ensure that the pin members 32 are correctly oriented with respect to the base plate 28 upon engagement thereof, and prevent rotation of the pin members 32 relative to the base plate 28. The pin walls 64 also fix the vertical position of the pin member 32 relative to the lever 74, which will be described hereinbelow, to prevent the pin member 32 from tilting and releasing from the lever 74 prior to activation of the lever 74 by the operator. It should be noted that the stem portion 60 could be formed in a manner other than circular to achieve the objects of the invention and, therefore, the invention is not limited to having pin members 32 having circular stem portions 60.

Each pin member 32 also has a generally sloped flange 66 which extends outwardly from the piercing portion 62 of the pin member 32 proximate to the pin walls 64. Each sloped flange 66 has a lower surface 68, which extends horizontally outwardly from the piercing portion 62 along the top of the pin walls 64, and an upper surface 70, which extends upwardly at an angle back toward the piercing portion 62 of the pin member 32. The pin walls 64 provide support and strength for the sloped flange 66. The sloped flange 66 is engaged by the pin engaging members 34 as will be discussed further herein. The pin member 32 is utilized for a shipping container 26 having a defined thickness.

In an alternative and preferred embodiment, the pin member 32a, as illustrated in FIG. 10, has a plurality of sloped flanges 66a provided on the stem portion 60a, which extend from at least one of the pin walls 64a which is not inserted through one of the slots 44. The pin member 32a illustrated in FIG. 10 allows the pin member 32a to accommodate shipping containers 26 having varying thicknesses, as will be discussed further herein. Like reference numerals are used to denote like elements.

As best illustrated in FIG. 8, each pin engaging member 34 is positioned on and extends from the second surface 38 of the base plate 28 proximate to one of the apertures 42 thereof. Each pin engaging member 34 includes a lever 74 and a stop 76. One of the pin engaging members 34 and associated aperture 42 is described with the understanding that the other pin engaging member 34 and the associated aperture 42 are identical thereto.

The stop 76 is positioned on one side of the aperture 42 and includes a first portion 78 and a second portion 80. The first portion 78 of the stop 76 extends generally perpendicularly from the second surface 38 of the base plate 28 as viewed in FIG. 8. The second portion 80 is generally curved toward the opposite side of the aperture 42 and extends from the free end of the first portion 78. The second portion 80 engages one of the pin walls 64, which is not inserted through one of the slots 44 to prevent upward movement of the pin member 32 as is further described herein.

When the pin member 32a is utilized, the mounting apparatus 76 must be configured to eliminate the stop 76 for reasons which will be discussed further herein.

Figure 3:
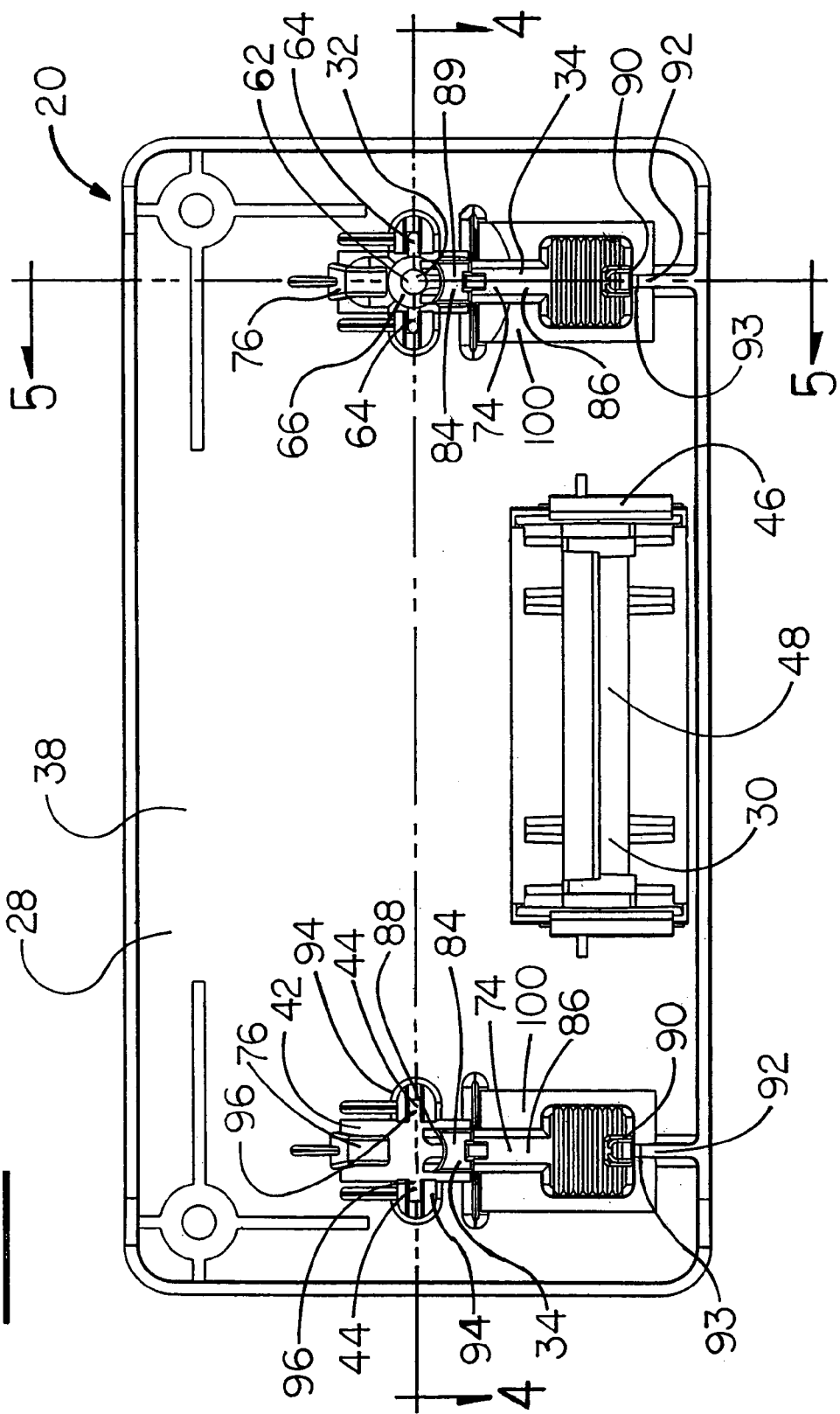
FIG. 3 is a top plan view of the mounting apparatus shown in FIG. 1.
Figure 6:
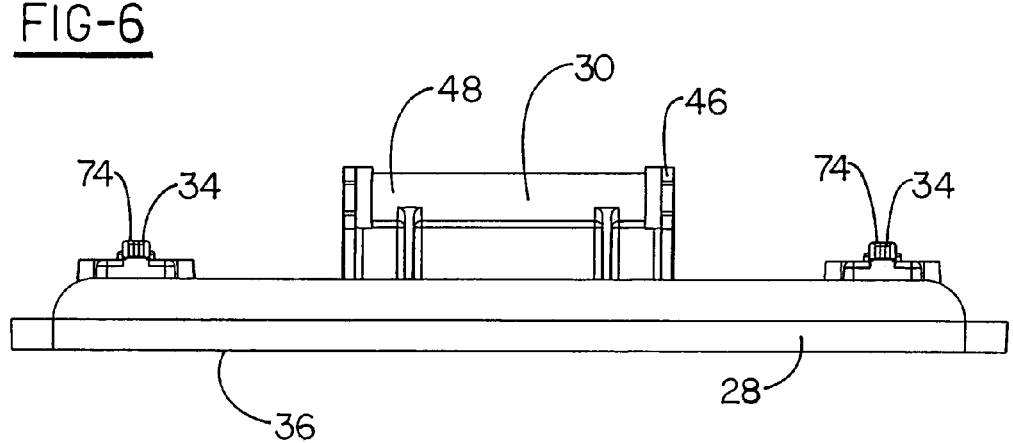
FIG. 6 is a front plan view of the mounting apparatus of FIG. 1, but without the pin member engaged with one of the pin engaging members.

The lever 74 is positioned on the opposite side of the aperture 42 than is the stop 76. The lever 74 includes a fulcrum 82, a first arm 84 and a second arm 86. The fulcrum 82 extends generally perpendicularly from the second surface 38 of the base plate 28 as viewed in FIG. 8 and is formed of a flexible and resilient material, such as plastic. The first arm 84 extends generally perpendicularly from the fulcrum 82 toward the aperture 42 and the stop 76 and partially overlies the aperture 42. The first arm 84 has a slotted end 88 and a portion 89 which overlies the slotted end 88, as best shown in FIG. 3. The second an 86 extends perpendicularly from the fulcrum 82 in the opposite direction of the first arm 84. When the mounting apparatus 20 is manufactured, an end 90 of the second arm 86 is connected to a flange 92 of the base plate 28 by a webbed bridge 93. The flange 92 prevents downward vertical movement of the second arm 86 beyond a position defined by the flange 92 until a downward force is applied to the second arm 86 which is greater than the force needed to move the second arm 86 downward beyond the flange 92. The downward vertical movement of the second arm 86 beyond the position defined by the flange 92 allows for the disengagement of the pin member 32 from the pin engaging member 34. The first time that the mounting apparatus 20 is utilized, the operator will be able to determine if the product 24 or the shipping container 26 have been tampered with if the second arm 86 is positioned below the flange 92, as the only way in which the second arm 86 could be in such a position is it the webbed bridge 93 between the flange 92 and the second arm 86 was broken, which could only occur if the force needed to move the second arm 86 downward beyond the flange 92 were applied.

During use, the portion 89 which covers the slotted end 88 engages the top of one of the pin walls 64, which is not inserted through one of the slots 44. The lower surface 68 of the sloped flange 66 prevents upward movement of the pin member 32 as described in further detail herein. When the pin member 32a is utilized, the mounting apparatus 76 must be configured to eliminate the cover 89 for reasons which will be discussed further herein.

A pair of guide members 94 are positioned oil and extend from the second surface 38 of the base plate 28 proximate to one of the apertures 42 thereof. As shown in FIG. 3, each guide member 94 has a slot 96 therethrough which is in communication with a respective slot 44 such that the respective pin wall 64 which extends through the slot 44 also extends into the slot 96 of the guide member 94.

The mounting apparatus 20, with the exception of the bolt 50 and the fastening member 54, may be manufactured by injection molding and formed of plastic such that it is relatively inexpensive and easy to make.

Figure 7:
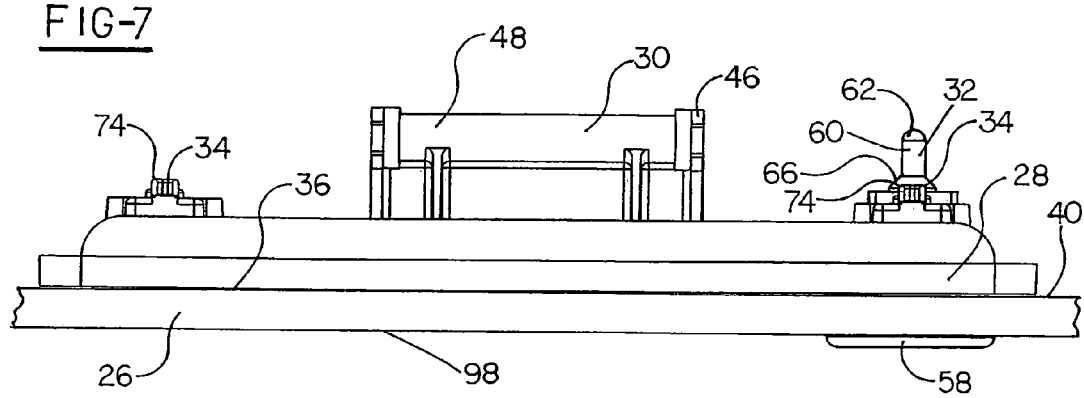
FIG. 7 is a front plan view of the mounting apparatus of FIG. 1, with the pin member engaged with one of the pin engaging members.

In operation, an operator positions the piercing portion 62 of the stem portion 60 of each of the pin members 32 against a second surface 98 of the shipping container 26. The operator then pushes the piercing portions 62 through the shipping container 26 such that the stem portions 60 of each of the pin members 32 are proximate to the first surface 40 of the shipping container 26 and the enlarged head portions 58 of the pin members 32 are flush against the second surface 98 of the shipping container 26, with the pin members 32 being disposed in the shipping container 26 at a predetermined distance apart, as best illustrated in FIGS. 7 and 9. The enlarged head portions 58 of the pin members 32 prevent the pin members 32 from traveling, i.e., being pushed or pulled, through the material of the shipping container 26. It should be noted that the shipping container 26 could have pre-formed holes (not shown) provided therethrough such that it is unnecessary for the operator to pierce holes through the shipping container 26 with the piercing portions 62 of the pin members 32.

The operator next places the base plate 28 into the shipping container 26, which could be formed of corrugated paper material, but could also be a pallet or the like, such that the stem portions 60 of the pin members 32, which are protruding into the interior of the shipping container 26, are received in the apertures 42 of the base plate 28. Two of the four pin walls 64 of each stem portion 60 of the pin members 32 are received in the slots 44 of the apertures 42 of the base plate 28 and in the slots 96 of the guide members 94 to assist in the proper alignment of the pin members 32 through the apertures 42 of the base plate 28, to prevent rotation of the pin members 32 and the base plate 28 relative to one another. Also, the pin members 32 must be perpendicularly oriented relative to the base plate 28 to mount the base plate 28 with hands free engagement.

The base plate 28 is then pushed down, toward the first surface 40 of the shipping container 26, such that the pin members 32 are received in the apertures 42 of the base plate 28. Only one engagement of the pin members 32 with the pin engaging members 34 is described with the understanding that the other engagement of the pin member 32 with the pin engaging member 34 is identical thereto. The stem portion 60 of the pin member 32 snaps with the slotted end 88 of the first arm 84 of the lever 74. The sloped surface 68 of the portion 66 facilitates movement of the pin member 32 past the slotted end 88 of the first arm 84 of the lever 74 because the sloped surface 68 is a relatively smooth surface such that the slotted end 88 of the first arm 84 does not get hung up on the sloped surface 68. Once the enlarged head portion 58 of the pin member 32 is flush with the second surface 98 of the shipping container 26, the cover 89 of the slotted end 88 and the stop 76 are engaged with diametrically opposed pin walls 64 to prevent further upward movement of the pin member 32 relative to the base plate 28. The slotted end 88 of the first arm 84 of the lever 74 is further held in the area bounded by the lower surface 70 of flange 66 such that the flange 66 prevents downward movement of the pin member 32 relative to the base plate 28. Thus, the pin member 32 cannot be pulled out of the aperture 42 of the base plate 28, thus securing the base plate 28 to the shipping container 26. Should a person attempt to pull the pin member 32 out of engagement with the pin engaging member 34 and the base plate 28 without utilizing the lever 74, the pin member 32 will not be disengaged with the pin engaging member 34 as the pin member 32 will abut against the pin engaging member 34 as the slotted end 88 will be engaged with the lower surface 68 of the sloped flange 66.

The operator then attaches the bicycle fork 22 of the bicycle 24 to the fork holder 46 of the mounting device 30 such that the C-shaped portions 52 of the bicycle fork 22 are placed on the bolt 50. The nut 54 is then tightened such that the bicycle fork 22 is removably attached to the fork holder 46. When the bicycle 24 is mounted in such a manner to the shipping container 26, the bicycle 24 is fixed within the shipping container 26 such that damage to the bicycle 24 during shipment is prevented.

To remove the mounting apparatus 20 from the shipping container 26, the operator can apply a force to the second arm 86 of the lever 74 of one of the pin engaging members 34, with the understanding the same would be done in connection with the other pin engaging member 34, such that the second arm 86 of the lever 74 is forced downward on one side of the fulcrum 82 toward the base plate 28, and such that the first arm 84 of the lever 74 is forced upwardly on an opposite side of the fulcrum 82, away from the base plate 28. When the first arm 84 of the lever 74 are forced upwardly, the slotted end 88 of the first arm 84 of the lever 74 is also moved upwardly and toward the fulcrum 82 such that the slotted end 88 is released from under the sloped flange 66 of the pin member 32, such that the pin member 32 can be moved out of the aperture 42 of the base plate 28 and out of the shipping container 26. Upon the first use of the mounting apparatus 20, the operator may be able to determine if the mounting apparatus 20, the product 24 or the shipping container 26 were tampered with prior to the removal of the mounting apparatus 20 from the shipping container 26 by determining if the webbed bridge 93 between the flange 92 and the second and 86 was broken. If the webbed bridge 93 is broken, then somebody or something must have applied a force to the second arm 86 to break the webbed bridge 93, releasing the slotted end 88 of the first arm 84 from engagement with the pin member 32.

After removing the pin members 32 from engagement with the pin engaging members 34, the second arm 86 of the lever 74 will be positioned below the flange 92 and locked in an open position such that the pin members 32 can be removed therefrom. Thereafter, should the operator desire to utilize the mounting apparatus 20 again, the operator can manipulate the second arm 86 of the lever 74 to position it above the flange 92 such that the flange 92 again prevents downward movement of the second arm 86 unless a force is applied thereto. At this point, the operator will not be able to determine if the mounting apparatus 20 has been tampered with as the webbed bridge 93 will have already been broken.

It should be noted that the sequence of events described hereinabove for the operation of the invention could be changed as desired where allowable, i.e., the bicycle 24 could be attached to mounting device 30 prior to the pin members 32 being extended through the shipping container 26, or the bicycle 24 could be attached to the mounting device 30 before the pin members 32 are connected to the pin engaging members 34.

The pin member 32*a* illustrated in FIG. 10 could be utilized to accommodate shipping containers 26 having varying thicknesses 26. If the pin member 32*a* is utilized, the mounting apparatus 20 would be manufactured to eliminate the stop 76 and the cover 89 of the slotted end 88. The operation with the pin member 32*a* is identical to the operation with the pin member 32 except that the pin walls 64*a* are not stopped by the stop 76 and the cover 89, as they are not provided for in the mounting apparatus used with the pin member 32*a*. Thus, the pin member 32*a* can extend through varying thicknesses of material of the shipping container 26 such that the slotted end 88 of the lever 74 is positioned between two adjacent sloped flanges 66*a* of the pin member 32*a* which prevent downward movement of the pin member 32*a*.

Thus, the mounting apparatus 20 provides a number of advantages over the prior art. Some of these advantages are that the mounting apparatus 20 is easily and inexpensively manufacture thereof, it does not require the use of tools for mounting, it can accommodate shipping containers 26 of varying thicknesses, it can only be mounted if the pin members 32, 32*a* are properly oriented relative to the base plate 28, it can provide proof of tampering upon first use, and it can be reused a number of times without causing damage thereto.

While a preferred embodiment of the present invention is shown and described, it is envisioned that those skilled in the art may devise various modifications of the present invention departing from the spirit and scope of the appended claims.

What is claimed is:

1. An apparatus for mounting a product to a structure, said apparatus comprising:

a base plate having first and second opposite surfaces and at least one aperture which extends through said base plate from said first surface to said second surface, said at least one aperture defining an aperture wall, said second surface of said base plate capable of being positioned against a first surface of the structure;

a pin member associated with said at least one aperture of said base plate, said pin member having an enlarged head portion and a stem portion extending therefrom, said stem portion capable of extending through the structure and said at least one associated aperture of said base plate, said head portion capable of being positioned against a second surface of the structure, said pin member interengaging said aperture wall of said base plate to prevent rotation of said pin member relative to said base plate;

a pin engaging member associated with said pin member, said pin engaging member being attached to and extending from said first surface of said base plate and away from said second surface of said base plate, said pin engaging member being configured to releaseably hold said associated pin member; and means for mounting the product to said base plate.

2. An apparatus as defined in claim 1, wherein said base plate has two apertures provided therethrough, said two apertures being provided on opposite sides of said mounting means.

3. An apparatus as defined in claim 1, wherein said stem portion of said pin member includes a piercing portion for piercing through the structure to allow the stem portion to extend through the structure.

4. An apparatus as defined in claim 1, wherein said pin member has a plurality of pin walls extending radially outwardly from said stem portion of said pin member.

5. An apparatus as defined in claim 4, wherein said at least one aperture through said base plate has a plurality of slots for accepting said pin walls of said pin member and for orientating said base plate relative to said pin member upon engagement thereof, said pin walls of said pin member configured to interengage with said aperture wall of said base plate.

6. An apparatus as defined in claim 1, wherein the product is a bicycle and the structure is a shipping container, and wherein said mounting means is configured to mount a fork of the bicycle to the shipping container.

7. An apparatus for mounting a product to a structure, said apparatus comprising:

a base plate having at least one aperture therethrough, said at least one aperture defining an aperture wall, said base plate capable of being positioned against a first surface of the structure;

a pin member associated with said at least one aperture of said base plate, said pin member having an enlarged head portion and a stem portion extending therefrom, said stem portion capable of extending through the structure and said at least one associated aperture of said base plate, said head portion capable of being positioned against the structure, said pin member interengaging said aperture wall of said base plate to prevent rotation of said pin member relative to said base plate;

a pin engaging member associated with said pin member, said pin engaging member being configured to releaseably hold said associated pin member, said pin engaging member includes a lever and a stop, said lever and said stop capable of engaging said stem portion of said pin member to releaseably hold said pin member; and means for mounting the product to said base plate.

8. An apparatus as defined in claim 7, wherein said lever is hand-manipulated.

9. An apparatus for mounting a product to a structure, said apparatus comprising:

a base plate having at least one aperture therethrough, said base plate capable of being positioned against a first surface of the structure;

a pin member associated with said at least one aperture of said base plate, said pin member having an enlarged head portion and a stem portion extending therefrom, said stem portion capable of extending through the structure and said at least one associated aperture of said base plate, said head portion capable of being positioned against the structure;

a pin engaging member associated with said pin member, said pin engaging member capable of releaseably holding said associated pin member, said pin engaging member includes a lever and a stop, said lever and said stop capable of engaging said stem portion of said pin member to releaseably hold said pin member, said lever has first and second arms with a fulcrum provided therebetween, said second arm of said lever capable of being rotated downwardly relative to said fulcrum upon an application of force thereto such that said first arm of said lever rotates upwardly relative to said fulcrum to release said stem portion of said pin member from engagement with said lever; and means for mounting the product to said base plate.

10. An apparatus as defined in claim 9, wherein said first arm of said lever has a slot therein for receiving said stem portion and a cover positioned above said slot of said pin member for holding said stem portion of said pin member.

11. An apparatus as defined in claim 9, wherein said stem portion of said pin member has at least one flange extending therefrom, said first arm of said lever being positioned below said at least one flange to retain said pin member within said pin engaging member.

12. An apparatus as defined in claim 11, wherein said at least one flange extending from said stem portion has a sloped upper surface and a flat lower surface.

13. An apparatus as defined in claim 9, further comprising means for locking said lever in a position which prevents said stem portion of said pin member from re-engaging with said lever.

14. An apparatus as defined in claim 13, wherein said lever is capable of being manipulated to override said locking means such that said lever can be repositioned to re-engage with said stem portion of said pin member.

15. An apparatus as defined in claim 13, wherein said locking means is a flange extending from said base plate.

16. An apparatus as defined in claim 9, wherein said base plate has a flange extending therefrom, said flange of said base plate and said second arm of said lever initially being connected by a webbed bridge, wherein if said webbed bridge is broken, which occurs when said lever is depressed, the breakage of the webbed bridge indicates that the apparatus has been tampered with.

17. An apparatus for mounting a product to a structure, said apparatus comprising:

a base plate having at least one aperture therethrough, said at least one aperture defining an aperture wall, said base plate capable of being positioned against a first surface of the structure;

a pin member associated with said at least one aperture of said base plate, said pin member having an enlarged head portion and a stem portion extending therefrom, said stem portion capable of extending through the structure and said at least one associated aperture of said base plate, said head portion capable of being positioned against the structure, said pin member interengaging said aperture wall of said base plate to prevent rotation of said pin member relative to said base plate;

a pin engaging member associated with said pin member, said pin engaging member being configured to releaseably hold said associated pin member, said pin engaging member includes a lever which is capable of engaging said stem portion of said pin member to releasably hold said pin member; and means for mounting the product to said base plate.

18. An apparatus as defined in claim 17, wherein said lever is hand-manipulated.

19. An apparatus for mounting a product to a structure, said apparatus comprising:

a base plate having at least one aperture therethrough, said base plate capable of being positioned against a first surface of the structure;

a pin member associated with said at least one aperture of said base plate, said pin member having an enlarged head portion and a stem portion extending therefrom, said stem portion capable of extending through the structure and said at least one associated aperture of said base plate, said head portion capable of being positioned against the structure;

a pin engaging member associated with said pin member, said pin engaging member capable of releaseably holding said associated pin member, said pin engaging member includes a lever which is capable of engaging said stem portion of said pin member to releaseably hold said pin member, said lever has first and second arms with a fulcrum provided therebetween, said second arm of said lever capable of being rotated downwardly relative to said fulcrum upon an application of force thereto such that said first arm of said lever rotates upwardly relative to said fulcrum to release said stem portion of said pin member from engagement with said lever; and means for mounting the product to said base plate.

20. An apparatus as defined in claim 19, wherein said first arm of said lever has a slot therein for receiving said stem portion, said first arm of said lever capable of holding said stem portion of said pin member.

21. An apparatus as defined in claim 19, wherein said stem portion of said pin member has at least one flange extending therefrom, said first arm of said lever being positioned below said at least one flange to retain said pin member within said pin engaging member.

22. An apparatus as defined in claim 21, wherein said at least one flange extending from said stem portion has a sloped upper surface and a flat lower surface.

23. An apparatus as defined in claim 21, wherein said stem portion of said pin member has a plurality of flanges extending therefrom.

24. An apparatus as defined in claim 23, wherein said plurality of flanges extending from said stem portion have a sloped upper surface and a flat lower surface.

25. An apparatus as defined in claim 19, wherein said base plate has a flange extending therefrom said flange of said base plate and said second arm of said lever initially being connected by a webbed bridge, wherein if said webbed bridge is broken, which occurs when said lever is depressed, the breakage of said webbed bridge indicates that the apparatus has been tampered with.

26. An apparatus as defined in claim 19, further comprising means for locking said lever in a position which prevents said stem portion of said pin member from re-engaging with said lever.

27. An apparatus as defined in claim 26, wherein said lever is capable of being manipulated to override said locking means such that said lever can be repositioned to re-engage with said stem portion of said pin member.

28. An apparatus as defined in claim 26, wherein said locking means is a flange extending from said base plate.

29. An apparatus for mounting a product to a structure, said apparatus comprising:
a base plate having at least one aperture therethrough, said at last one aperture defining an aperture wall, said base plate capable of being positioned against a first surface of the structure;
a pin member associated with said at least one aperture of said base plate, said pin member having an enlarged head portion and a stem portion extending therefrom, said stem portion capable of extending through the structure and said at least one associated aperture of said base plate, said head portion capable of being positioned against the structure, said pin member interengaging said aperture wall of said base plate to prevent rotation of said pin member relative to said base plate, said pin member having a plurality of pin walls extending radially outwardly from said stem portion of said pin member;
a pin engaging member associated with said pin member, said pin engaging member being configured to releaseably hold said associated pin member, wherein said at least one aperture through said base plate has a plurality of slots for accepting said pin walls of said pin member and for orientating said base plate relative to said pin member upon engagement thereof, said pin walls of said pin member configured to interengage with said aperture wall of said base plate;
means for mounting the product to said base plate; and
at least one guide member having a slot therein for accepting and holding at least one of said plurality of pin walls of said pin member.

30. An apparatus for releasably mounting a product to a structure, said apparatus comprising:
a base plate having first and second opposite surfaces and at least one aperture which extends through said base plate from said first surface to said second surface, said at least one aperture defining an aperture wall, said second surface of said base plate capable of being positioned against a first surface of the structure;
a pin member associated with said at least one aperture of said base plate, said pin member having an enlarged head portion and a stem portion extending therefrom, said stem portion capable of extending through the structure and said at least one associated aperture of said base plate, said head portion capable of being positioned against a second surface of the structure, said pin member interengaging said aperture wall of said base plate to prevent rotation of said pin member relative to said base plate;
a pin engaging member associated with said pin member, said pin engaging member being attached to and extending from said first surface of said base plate and away from said second surface of said base plate, said pin engaging member being configured to hold said associated pin member; and
means for releasably mounting the product to said base plate.

31. An apparatus as defined in claim 30, wherein said base plate has two apertures provided therethrough, said two apertures being provided on opposite sides of said mounting means.

32. An apparatus as defined in claim 30, wherein said pin engaging member includes a stop, said stop capable of engaging said stem portion of said pin member to hold said pin member.

33. An apparatus as defined in claim 32, wherein said stem portion of said pin member has at least one flange extending therefrom, said stop being positioned below said at least one flange to retain said pin member within said pin engaging member.

34. An apparatus as defined in claim 33, wherein said stem portion of said pin member has a plurality of flanges extending therefrom.

35. An apparatus as defined in claim 33, wherein said at least one flange extending from said stem portion has a sloped upper surface and a flat lower surface.

36. An apparatus comprising:
a pin engaging member having a wall defining an aperture, said aperture having a first central portion and a second portion which extends outwardly from said first central portion, said pin engaging member further having a wall portion, said wall portion overlies said second portion of said aperture to at least partially close off an end thereof; and
a pin member having a stem portion of a predetermined length, at least one pin wall extending outwardly from said stem portion along a predetermined portion of said predetermined length, at least one flange extending from said stem portion generally perpendicular to said predetermined length,
wherein said pin member is configured such that said at least one pin wall can be inserted into said second portion of said pin engaging member to prevent rotation of said pin member relative to said pin engaging member, and such that said wall portion is positioned generally between said at least one flange and at least a portion of said at least one pin wall.

37. An apparatus as defined in claim 36, wherein said stem portion has four pin walls which extend outwardly from said stem portion.

38. An apparatus as defined in claim 37, wherein each said pin wall is separated from an adjacent pin wall by ninety degrees.

39. An apparatus as defined in claim 26, wherein said at least one flange has a sloped upper surface and a flat lower surface.

40. An apparatus as defined in claim 39, wherein said flat lower surface is configured to be positioned against said wall portion of said pin engaging member.

41. An apparatus as defined in claim 39, wherein said stem portion has a plurality of flanges extending therefrom.

42. An apparatus comprising:

a pin engaging member having a wall defining an aperture, said aperture having a first central portion and a second portion which extends outwardly from said first central portion, said pin engaging member further having a wall portion, said wall portion overlies said second portion of said aperture to at least partially close off an end thereof; and a pin member having a stem portion of a predetermined length, at least one pin wall extending outwardly from said stem portion along a predetermined portion of said predetermined length, at least one flange extending from said stem portion generally perpendicular to said axis of said pin member, wherein said pin member is configured such that said at least one pin wall can be inserted into said second portion of said pin engaging member to prevent rotation of said pin member relative to said pin engaging member, said wall portion and said at least one flange being configured to substantially prevent movement of said pin member relative to said pin engaging member in at least one direction along said predetermined length of said pin member.

43. An apparatus as defined in claim 42, wherein said stem portion has four pin walls which extend outwardly from said stem portion.

44. An apparatus as defined in claim 43, wherein each said pin wall is separated from an adjacent pin wall by ninety degrees.

45. An apparatus as defined in claim 42, wherein said at least one flange has a sloped upper surface and a flat lower surface.

46. An apparatus as defined in claim 42, wherein said stem portion has a plurality of flanges extending therefrom.

47. An apparatus as defined in claim 42, further including means for moving said wall portion of said pin engaging member, said moving means being configured to allow movement of said pin member relative to said pin engaging member in said at least one direction along said predetermined length of said pin member.

48. An apparatus for releasably mounting a product to a structure, said apparatus comprising:

a base plate having an aperture which extends through said base plate, said aperture defining an aperture wall, said base plate capable of being positioned against the structure;

a pin member capable of extending through the structure and said aperture of said base plate in order to secure said base plate to the structure, said pin member interengaging said aperture wall of said base plate to prevent rotation of said pin member relative to said base plate;

a pin engaging member including a lever which is capable of engaging said pin member to releasably hold said pin member within said aperture of said base plate, said lever having first and second arms with a fulcrum provided therebetween, said second arm of said lever capable of being rotated downwardly relative to said fulcrum upon an application of force thereto such that said first arm of said lever rotates upwardly relative to said fulcrum to release said pin member from engagement with said lever;

means for locking said lever in a position which prevents said pin member from re-engaging with said lever; and means for releasably mounting the product to said base plate.

49. An apparatus as defined in claim 48, wherein said base plate has a flange extending therefrom, said flange of said base plate and said second arm of said lever initially being connected by a webbed bridge, wherein if said webbed bridge is broken, which occurs when said lever is depressed, the breakage of the webbed bridge indicates that the apparatus has been tampered with.

50. An apparatus as defined in claim 48, wherein said lever is capable of being manipulated to override said locking means such that said lever can be repositioned to re-engage with said pin member.

51. An apparatus as defined in claim 48, wherein said locking means is a flange extending from said base plate.

* * * * *

UNITED STATES PATENT AND TRADEMARK OFFICE
CERTIFICATE OF CORRECTION

| | | |
|---|---|---|
| PATENT NO. | : 7,077,374 B1 | Page 1 of 1 |
| APPLICATION NO. | : 10/256595 | |
| DATED | : July 18, 2006 | |
| INVENTOR(S) | : Thomas Joseph Johnson | |

It is certified that error appears in the above-identified patent and that said Letters Patent is hereby corrected as shown below:

Column 12, Line 60 "claim 26" should read -- claim 36 --

Signed and Sealed this

Seventh Day of November, 2006

JON W. DUDAS
*Director of the United States Patent and Trademark Office*